(12) United States Patent
Kojima et al.

(10) Patent No.: US 8,798,061 B2
(45) Date of Patent: Aug. 5, 2014

(54) COMMUNICATION APPARATUS, COMMUNICATION METHOD, AND COMPUTER PROGRAM

(75) Inventors: Toshiaki Kojima, Kanagawa (JP); Mizuki Kanada, Kanagawa (JP); Naoki Inomata, Kanagawa (JP); Katsuyuki Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 13/025,268

(22) Filed: Feb. 11, 2011

(65) Prior Publication Data

US 2011/0200046 A1    Aug. 18, 2011

(30) Foreign Application Priority Data

Feb. 17, 2010    (JP) ................. P2010-031985

(51) Int. Cl.
*H04L 12/28*    (2006.01)
(52) U.S. Cl.
USPC .................. 370/392; 370/389; 370/390
(58) Field of Classification Search
None
See application file for complete search history.

(56) References Cited

U.S. PATENT DOCUMENTS 7,817,633 B1 * 10/2010 Parker et al. ............. 370/392
7,912,071 B2 *  3/2011 Ikeda et al. ............. 370/395.53
8,064,465 B2 * 11/2011 Deguchi et al. ............ 370/395.6
2004/0032868 A1 *  2/2004 Oda et al. ................. 370/389
2004/0168127 A1 *  8/2004 Sakurai et al. ............. 715/526

FOREIGN PATENT DOCUMENTS

JP    2001 60956    3/2001

OTHER PUBLICATIONS

Andersson T Madsen Acreo AB L: "Provider Provisioned Virtual Private Network (VPN) Terminology; rfc4026.txt", IETF Standard, Internet Engineering TAK Force, IETF, CH, Mar. 1, 2005, XP 015041973, ISSN: 0000-0003.
"IEEE Standard for Local and Metropolitan Area Networks—Link Aggregation; IEEE Std-802.1AX-2008", IEEE Standard, IEEE, Piscataway, NJ, USA, Nov. 3, 2008), pp. c1-145, XP017602052, ISBN: 978-0-7381-5794-8.

* cited by examiner

*Primary Examiner* — Hassan Phillips
*Assistant Examiner* — Mark A Mais
(74) *Attorney, Agent, or Firm* — Frommer Lawrence & Haug LLP; William S. Frommer

(57) ABSTRACT

Disclosed herein is a communication apparatus, including: a transmission policy holding section configured to hold transmission policies each corresponding to a conversation; and a transmitted frame control section configured to modify transmitted frames of the conversation in accordance with the corresponding transmission policy held by the transmission policy holding section.

12 Claims, 13 Drawing Sheets

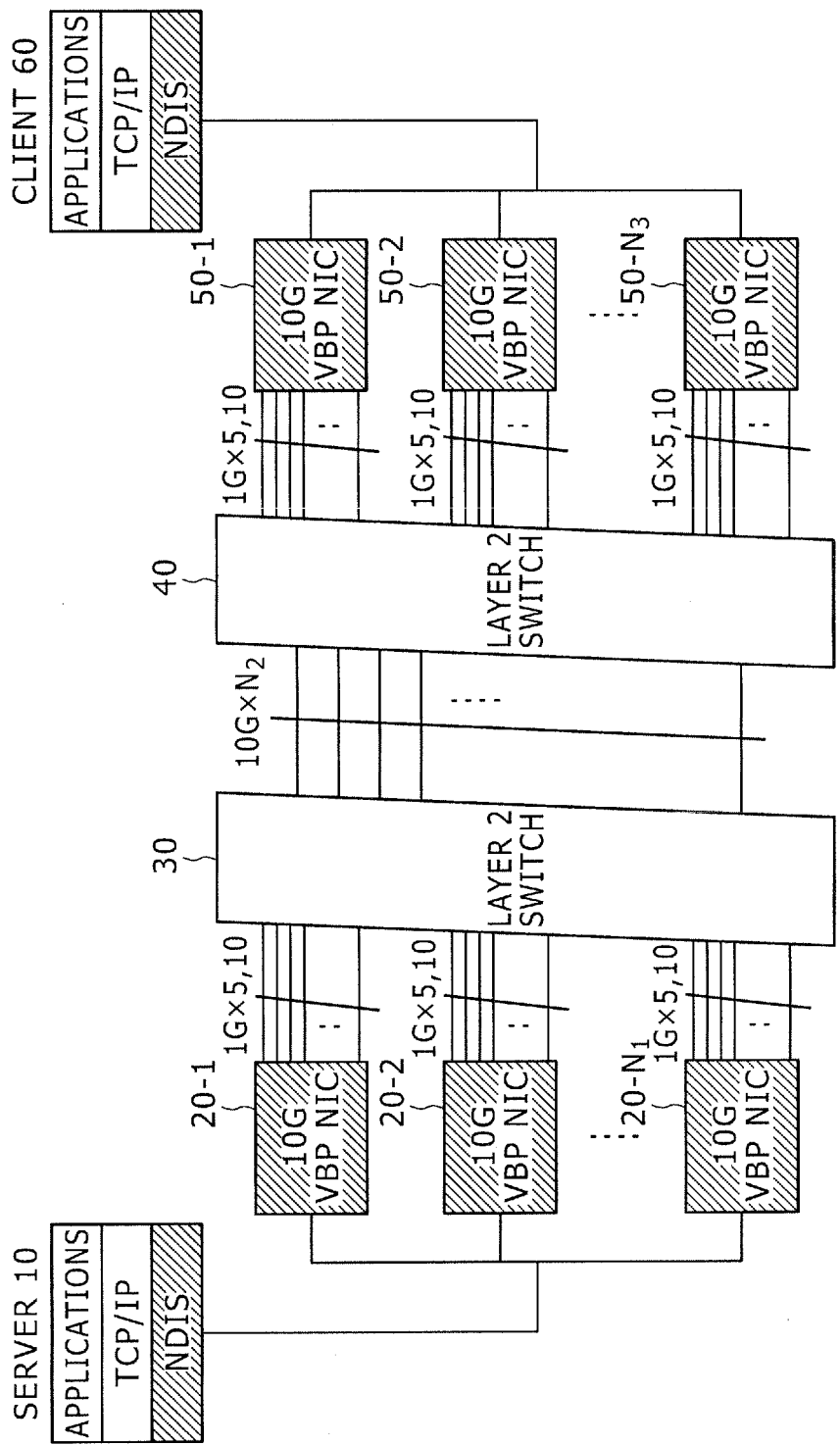

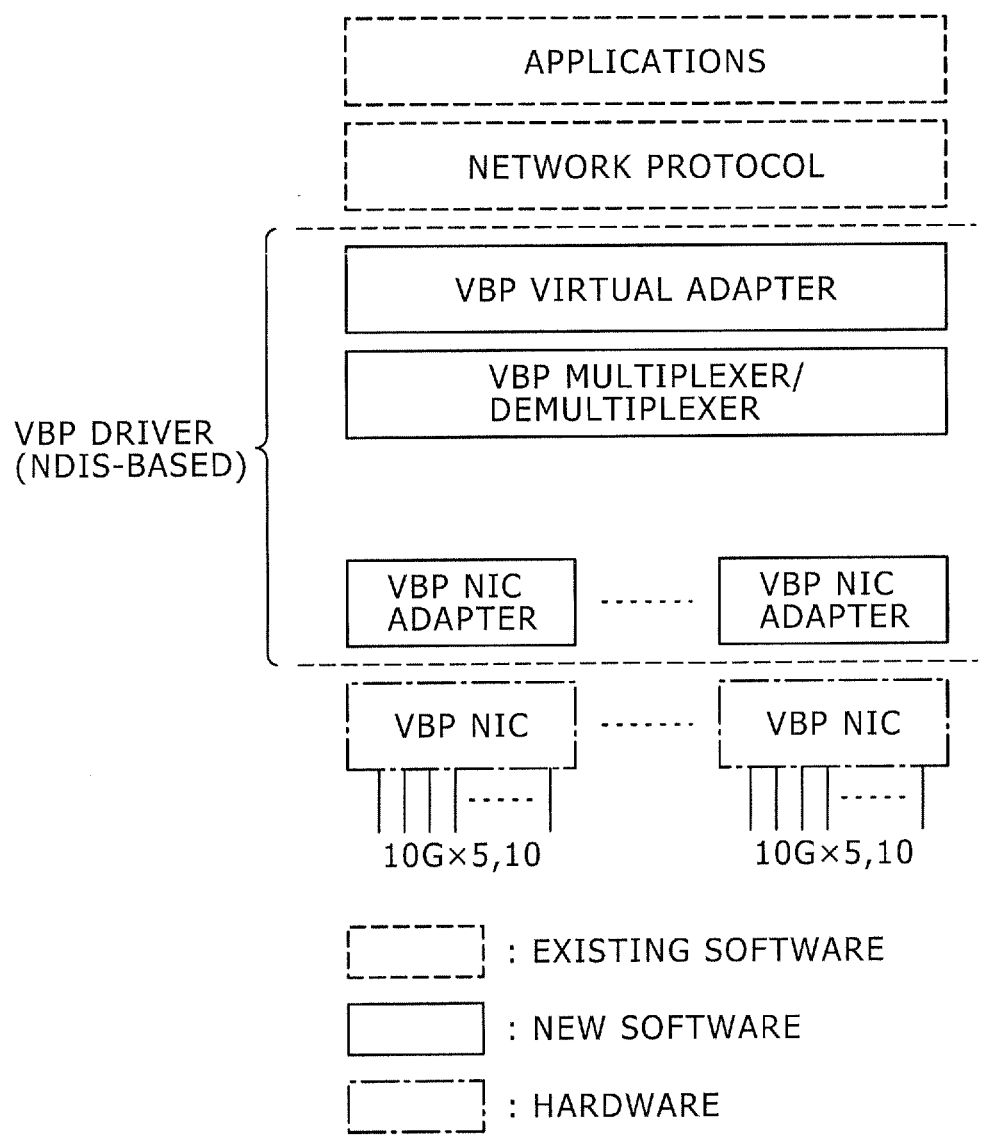

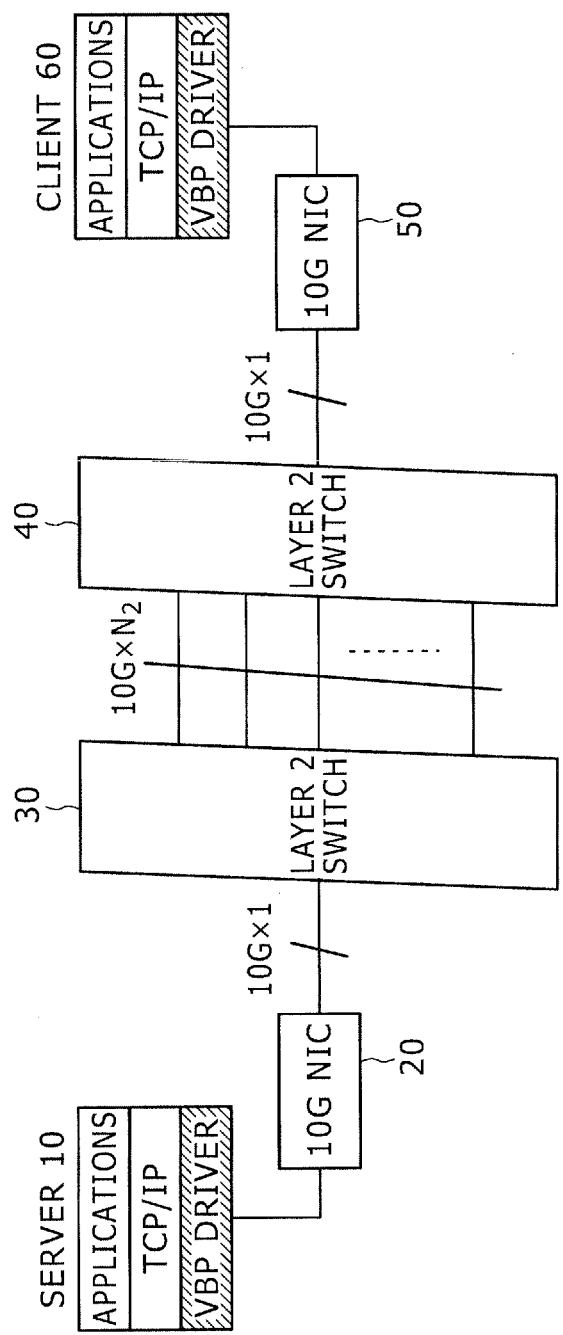

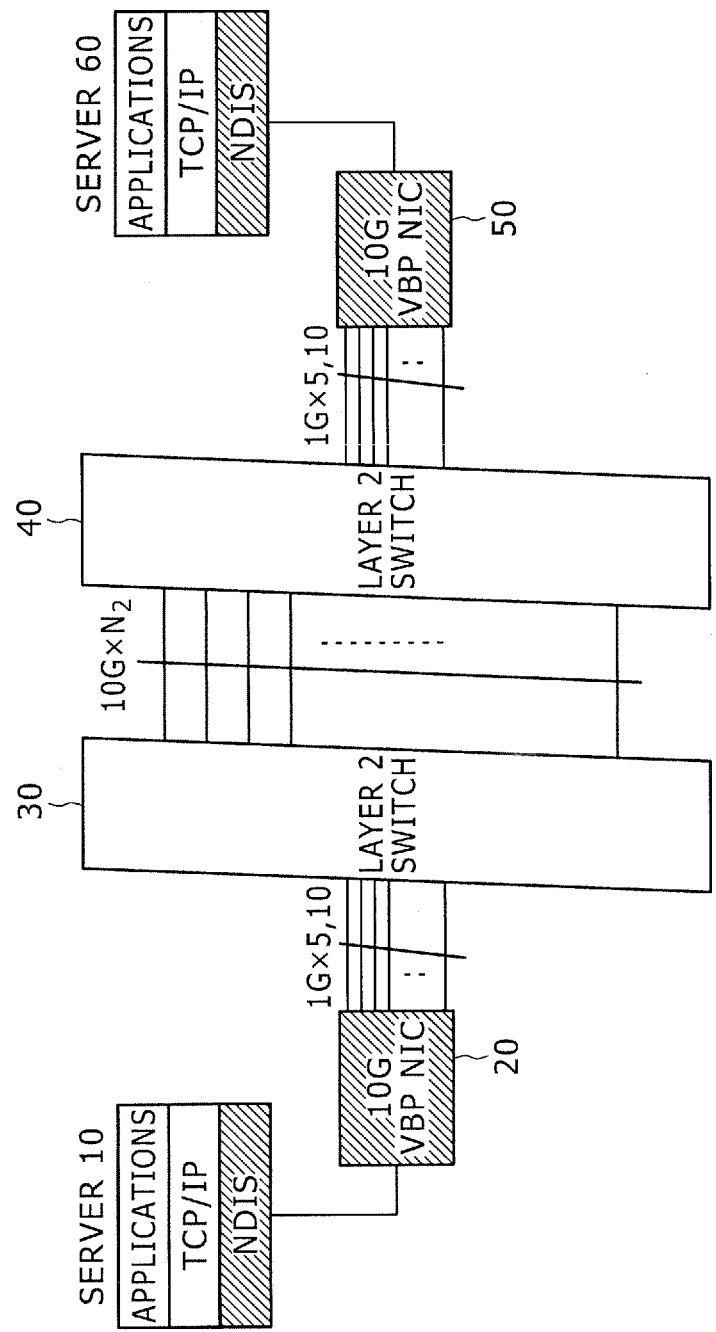

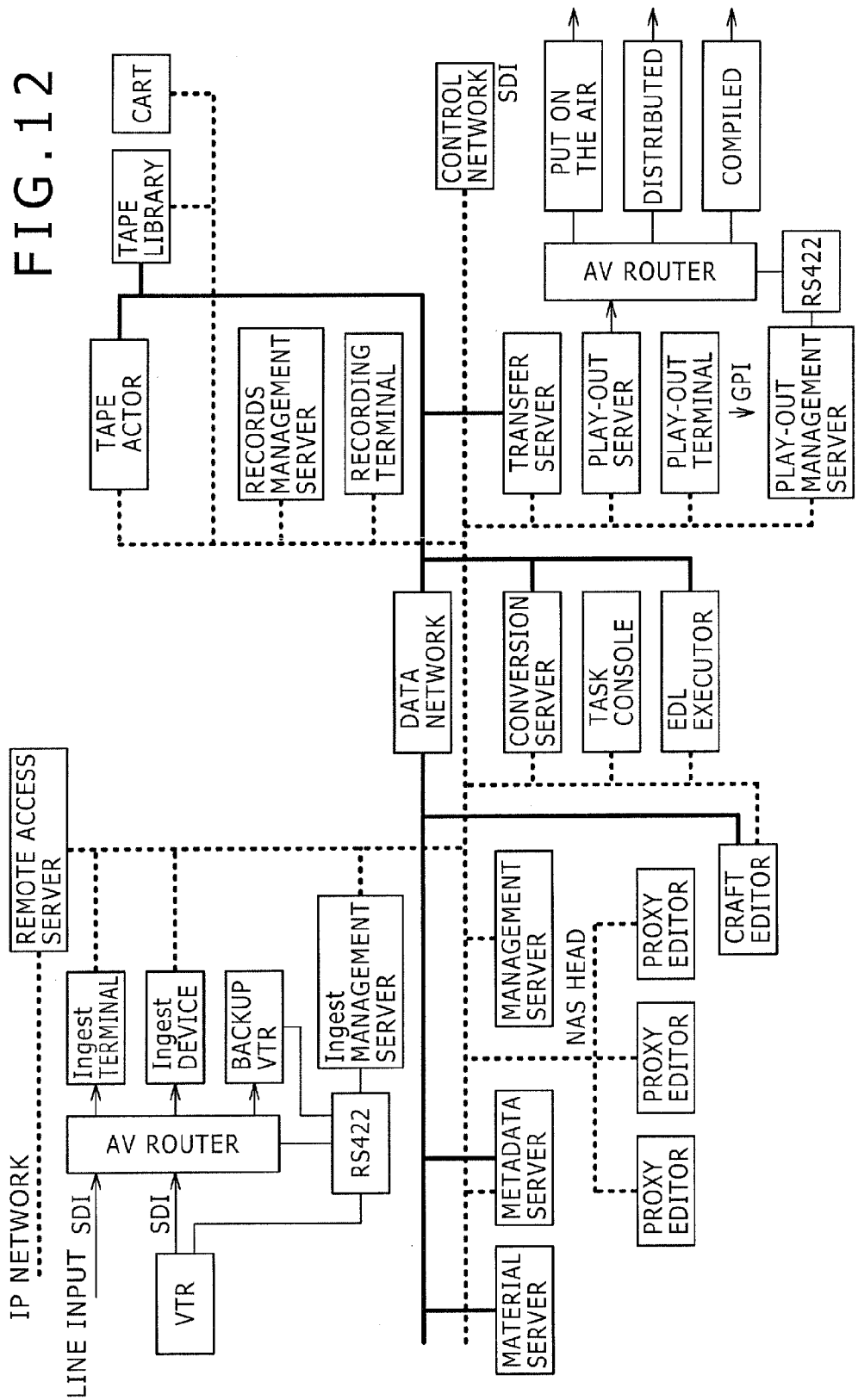

COMMUNICATION APPARATUS, COMMUNICATION METHOD, AND COMPUTER PROGRAM

BACKGROUND OF THE INVENTION

1. Field of the Invention

The present invention relates to a communication apparatus, a communication method, and a computer program for performing data transfers in accordance with the layer 2 protocols of the OSI (Open Systems Interconnection) reference model. More particularly, the invention relates to a communication apparatus, a communication method, and a computer program for carrying out data transfers over network paths from the transmitting side to the receiving side in the layer 2 network environment.

2. Description of the Related Art

According to the OSI reference model, which is a design principle established by the International Organization for Standardization (ISO) regarding network structures, communication functions are divided into seven layers. Of these layers, layer 2 is a data link layer that corresponds to the protocol stipulating signal transfers between communication apparatuses connected directly or adjacently. The data link layer addresses service requests from upper layers such as TCP/IP and requests services from the physical layer immediately below. Typical layer 2 protocols include Ethernet (registered trademark) and token ring.

Layer 2 is subdivided into a logical link control (LLC) sub-layer and a media access control (MAC) sub-layer below it. Layer 2 has no path control function. The layer 2 network is thus limited to within the same network address. The layer 2 network may also be considered a network limited to within the range in which MAC addresses can be obtained using ARP (Address Resolution Protocol) commands or within a broadcast domain.

In recent years, increasing quantities of transmission content have necessitated adopting larger bandwidths typically ranging from 40 to 100 Gbps. Commercially, however, reasonably priced communication media having bandwidths of about 10 Gbps are accepted extensively today. It is thus difficult for a single communication link adequately to address demands that presuppose the use of wider broadband setups. As a solution to the demands for handling the broadband-ready content, the inventors of the present invention envisage aggregating communication likes of lesser technical requirements for applications of 10 Gbps or thereabout in such a manner as to provide performance exceeding 40 Gbps.

Aggregating multiple communication links corresponds to the techniques called "multi-link" and "link aggregation." For example, there exist technical proposals regarding a multi-link communication method that statically provides paths each handling a plurality of external communications on the network layer in a manner allowing both the transmitting and the receiving sides to aggregate communications carried out per external connection path, the method further offering the aggregated communications as a single communication to the application layer (see Japanese Patent Laid-open No. 2001-60956).

Within the broadcast domain, multi-link need only be implemented based on the network protocols on or under layer 2 (e.g., MAC layer). According to definitions in the typical standards regarding network multi-link technology "IEEE 802.1 AX-2008 Link Aggregation," link aggregation allows one or more links to be aggregated together to form a Link Aggregation Group, such that a Media Access Control (MAC) Client can treat the Link Aggregation Group as if it were a single link.

Also according to the above-mentioned standards, Link Aggregation allows the establishment of full duplex point-to-point links that have a higher aggregation bandwidth than the individual links that form the aggregation. This allows improved utilization of available links in bridged LAN environments, along with improved resilience in the face of failure of individual links.

However, the above standards stipulate constraints on segmentation techniques and on modification of transmitted frames. For this reason, multi-link transfers of the same conversation are not available. Also, the standards do not permit multi-link transfers between Ethernet (registered trademark) switches or between an Ethernet switch and a destination communication apparatus.

Further according to the above standards, in the interests of simplicity and scalability, the connection function (on the layer 2 network) should not perform reassembly functions, reorder received frames, or modify received frames. Distribution functions, therefore, do not make use of segmentation techniques, do not label or otherwise modify transmitted frames in any way, and must operate in a manner that will inherently ensure proper ordering of received frames with the specified Collector.

In the current context, "conversion" corresponds to a session under TCP and is equivalent to a single stream effected by an application having a single purpose. For example, a conversion may be defined by a combination of a destination IP address with a destination port number. Traditionally, links and clients correspond to one another on a one-to-one basis. It is not assumed that a client uses multiple links. Since segmentation techniques are subject to constraint, one stream cannot be divided into multiple links (i.e., multi-linked).

Thug according to the link aggregation technique stipulated by the standards above, it is difficult to improve throughput per conversation.

In communication system configurations such as an ordinary server-client model whereby numerous clients are connected to a single server, the total throughput of multiple conversations need only be enhanced. That is, each conversation is connected to a link, and the conversation is not divided and distributed to a plurality of links. In this case, the link aggregation defined by the above standards apply unmodified.

In a server-client type network system illustrated in FIG. 10, an application (AP) operating on the server side is connected to a plurality of clients C1, C2, C3, etc., via a plurality of links through a network interface card (NIC) and a layer 2 switch. When the application requests each client C1, C2, C3, etc., to transfer a plurality of conversations (a, b, c, etc.), each conversation is distributed to a single link.

Meanwhile, in the broadcasting and the motion picture industries where super-size contents need to be transferred over networks, high throughput is required per conversation. However, this requirement is not met by the link aggregation stipulated by the standards above having no provisions for dividing each conversation into parts to be distributed to multiple links.

For example, in a server-client type network system illustrated in FIG. 11, a server is connected to clients via a plurality of links through layer 2 switches #1 and #2. Where the server is to transmit a super-size content "a" to the clients, it might be desired for the content "a" to be divided into a plurality of segments a1, a2, a3, etc., that might be distributed over the links. If that were the case, the links might be aggregated to constitute a broadband setup. However, according to the above standards, such link aggregation is not available due to the constraints on the reassembly functions, on reordering of received frames and on segmentation techniques.

SUMMARY OF THE INVENTION

The present invention has been made in view of the above circumstances and provides a communication apparatus, a communication method, and a computer program capable of performing data communication advantageously according to the layer 2 protocols of the OSI reference model.

The present invention also provides a communication apparatus, a communication method, and a computer program for carrying out data transfers over multiple links through network paths from the transmitting side to the receiving side in the layer 2 network environment.

In carrying out the present invention and according to one embodiment thereof, there is provided a communication apparatus including: a transmission policy holding section configured to hold transmission policies each corresponding to a conversation; and a transmitted frame control section configured to modify transmitted frames of the conversation in accordance with the corresponding transmission policy held by the transmission policy holding section.

Preferably, the transmitted frames modified by the transmitted frame control section may be output to a layer 2 switch performing link operations in accordance with the layer 2 protocols of the OSI reference model.

Preferably, each conversation may be made up of a series of data transmitted by an application, and may be defined by a combination of a destination IP address with a destination port number.

Preferably, the transmitted frame control section may modify transmitted frames between the TCP/IP layer and the MAC/PHY layer.

Preferably, the transmission policy holding section may hold the transmission policies having settings that serve as conditions for inputting conversations and as control policies by which to modify the transmitted frames of the conversation complying with the input conditions.

Preferably, the input conditions of the transmission policies may include at least one of the conditions made up of a conversation source MAC address, a conversation source port number, a conversation destination MAC address, a conversation destination IP address, and a conversation destination port number.

Preferably, the control policies may include at least one of the policies regarding addition of VLAN tags to the transmitted frames of conversations, modification of a transmission source MAC address, and modification of a transmission destination MAC address.

Preferably, the control policies may include rules for assigning at least one of a VLAN tag, a transmission source MAC address, and a MAC address to the transmitted frames of the conversation.

Preferably, the transmission policy holding section may hold control policies set dynamically, statically, manually, or automatically, each of the control policies corresponding to a conversation.

Preferably, the transmission policy holding section and the transmitted frame control section may each be implemented as a network driver or other software.

Preferably, the transmission policy holding section and the transmitted frame control section may each be implemented as a network interface card or other hardware.

According to another embodiment of the present invention, there is provided a communication method including the steps of: holding transmission policies each corresponding to a conversation; and modifying transmitted frames of the conversation in accordance with the corresponding transmission policy held in the transmission policy holding step.

According to a further embodiment of the present invention, there is provided a computer program written in a computer-readable format for causing a computer to perform processing for conducting data communications in accordance with the layer 2 protocols of the OSI reference model, the computer program including the steps of allowing the computer to function as: a transmission policy holding section configured to hold transmission policies each corresponding to a conversation; and a transmitted frame control section configured to modify transmitted frames of the conversation in accordance with the corresponding transmission policy held by the transmission policy holding section.

The computer program of the embodiment of the present invention is defined as a computer program written in a computer-readable format for causing a computer to realize predetermined processes. In other words, installing the computer program of the embodiment of the present invention into the computer enables the latter synergistically to exert effects equivalent to those of the communication apparatus according to the embodiment of the invention.

According to the present invention embodied as outlined above, network transmission control is performed in such a manner that multi-link data transfers are carried out from the transmitting side to the receiving side through network paths on a layer 2 network. This structure enables the improved communication apparatus, communication method, and computer program of the embodiment of the invention to broaden network bands at low cost.

Also according to the present invention embodied as outlined above, the function of transferring a single conversation through multiple links is implemented typically by modifying header information of transmitted frames in such a manner that a layer 2 switch between the transmitting and the receiving sides performs multi-link operations in accordance with a suitable transmission policy. Any conversation for which a transmission policy has yet to be set is handled in the same manner as in an ordinary NIC setup. This structure thus remains compatible with existing NIC's.

Also according to the present invention embodied as outlined above, a network is operated at lower cost, more easily, and on a higher bandwidth than before by aggregating links of lower bandwidths. For example, frames can be transmitted at 40 Gbps throughput without actually utilizing a 40-Gbps network. As another example, a network may be operated at the level of 10 Gbps in a low-cost 1 Gbps network environment.

Also according to the present invention embodied as outlined above, the transmission policies are established to include the conditions for inputting conversations and the control policies by which to modify the transmitted frames of the conversation complying with the input conditions. This structure makes it possible to modify the header information of transmitted frames, among others, so that a layer 2 switch interposed between the transmitting and the receiving sides may link operations.

Also according to the present invention embodied as outlined above, the input conditions of the transmission policies include at least one of the conditions made up of a conversation source MAC address, a conversation source port number, a conversation destination MAC address, a conversation destination IP address, and a conversation destination port number. This structure permits appropriate modification of the transmitted frames of a given conversation in accordance with the applicable transmission policy.

Also according to the present invention embodied as outlined above, a layer 2 switch interposed between the transmitting and the receiving sides is made to perform multi-link operations by assigning at least one of a VLAN tag, a transmission source MAC address, and a MAC address to the transmitted frames of the conversation complying with the input conditions of the applicable transmission policy. This structure realizes a multi-link setup for transmitting a single conversation.

Also according to the present invention embodied as outlined above, it is possible to hold the control policies set dynamically, statically, manually, or automatically, each of the control policies corresponding to a conversation.

BRIEF DESCRIPTION OF THE DRAWINGS

FIG. 4A is a schematic view showing a configuration example of a network system in which the transfer frame control function shown in FIG. 2 is implemented in the form of a network interface card;

FIG. 4B is a schematic view illustrating a protocol stack structure on the Windows (registered trademark) OS in the case where the transfer frame control function shown in FIG. 2 is implemented in the form of the network interface card as indicated in FIG. 4A;

FIG. 5A is a schematic view showing a configuration example of another network system in which the transfer frame control function shown in FIG. 2 is implemented in the form of drivers;

FIG. 6A is a schematic view showing a configuration example of another network system in which the transfer frame control function shown in FIG. 2 is implemented in the form of a network interface card;

FIG. 12 is a schematic view showing a configuration example of a file-based communication system.

DETAILED DESCRIPTION OF THE PREFERRED EMBODIMENTS

The preferred embodiments of the present invention will now be described below in detail by reference to the accompanying drawings.

Figure 1:
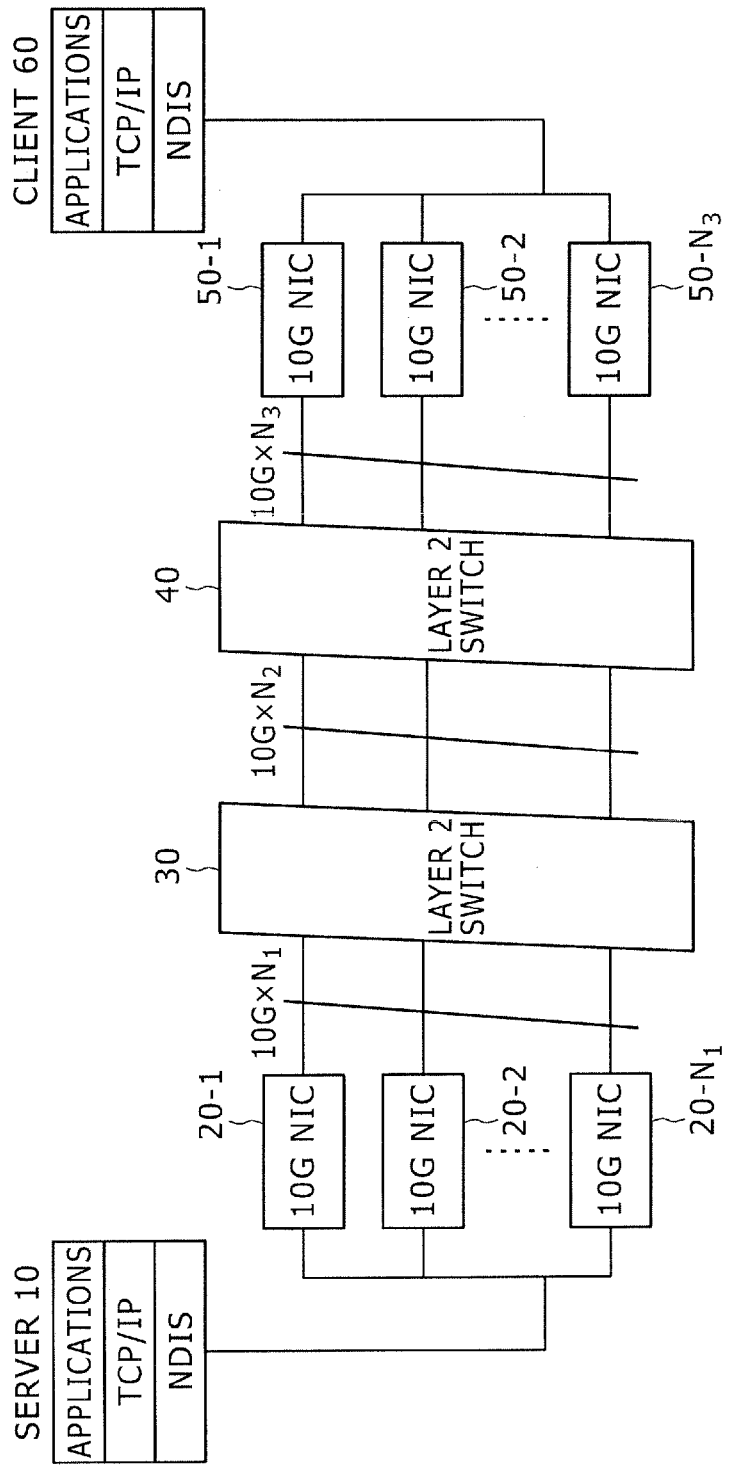
FIG. 1 is a schematic view showing a configuration example of a network system in which a server and a client are connected via two layer 2 switches.

FIG. 1 shows a configuration example of a network system in which a server 10 and a client 60 are connected via two layer 2 switches 30 and 40. The server 10 and client 60 may each be structured by a computer running on the Windows (registered trademark) operating system (OS) offered by Microsoft Corporation of the United States. In such a case, the communication protocols involved constitute a stacked structure made up of the layers of applications, TCP/IP, and drivers (Network Driver Interface Specification: NDIS) arranged from the top down.

The server 10 is furnished with as many as $N_1$ network interface cards (NIC) 20-1, 20-2, etc., and is connected to the layer 2 switch 30 through $N_1$ 10 Gbps Ethernet (registered trademark) links. Although each of the individual links connecting the server 10 with the layer 2 switch 30 has a bandwidth of 10 Gbps, forming a link aggregation therebetween can provide a higher overall bandwidth of up to $10 \times N_1$ Gbps derived from the $N_1$ links.

The layer 2 switches 30 and 40 are interconnected using as many as $N_2$ 10 Gbps Ethernet (registered trademark) links. Although each of the individual links interconnecting the layer 2 switches 30 and 40 has a bandwidth of 10 Gbps, forming a link aggregation therebetween can provide a higher overall bandwidth of up to $10 \times N_2$ Gbps derived from the $N_2$ links.

Meanwhile, the client 60 is furnished with as many as $N_3$ 100 Gbps network interface cards (NIC) 50-1, 50-2, etc., and is connected to the layer 2 switch 40 through $N_3$ 10 Gbps Ethernet (registered trademark) links Although each of the individual links connecting the client 60 with the layer 2 switch 40 has a bandwidth of 10 Gbps, forming a link aggregation therebetween can provide a higher overall bandwidth of up to $10 \times N_3$ Gbps derived from the $N_3$ links.

In the description that follows, a series of data transmitted from an application on the side of the server 10 or the client 60 will be referred to as a conversation. A conversation may be defined typically by a combination of a destination IP address with a destination port number.

The existing link aggregation technology involves distributing a plurality of conversations to a plurality of links that are aggregated so as to provide a higher overall bandwidth (to be discussed previously). In other words, when a single conversation is to be transferred, it is not divided into parts that are distributed to the links. Instead, the conversation is transmitted only through one link between the server 10 and the layer 2 switch 30, through one link between the layer 2 switches 30 and 40, and through one link between the layer 2 switch 40 and the client 60. This structure is thus equivalent to connecting the server with the client using a single link.

As opposed to the above-mentioned structure, explained below is a method for implementing a link aggregation or a multi-link structure for transferring a single conversation by supplementing a server-client type network system with the transfer frame control function.

Figure 2:
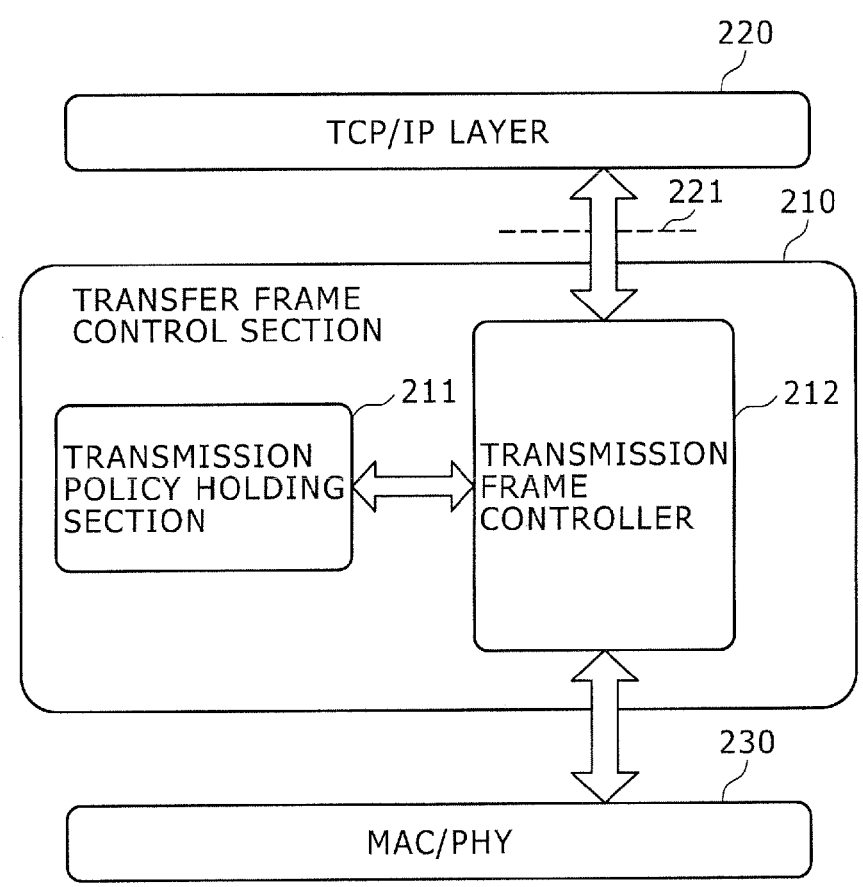
FIG. 2 is a block diagram showing schematically the structure of a transfer frame control function.

FIG. 2 shows schematically the structure of a transfer frame control function. In this specification, the transfer frame control function is also referred to as Virtual Big Pipe (VBP). In the example of FIG. 2, a transfer frame control section 210 provides the function of controlling frame transfers in accordance with the layer 2 protocols of the OSI reference model. The transfer frame control section 210 is interposed between a TCP/IP layer 220 and a MAC/PHY layer 230. Usually, what comes between the TCP/IP layer 220 and the MAC/PHY layer 230 corresponds to a MAC service interface 221.

The transfer frame control section 210 includes a transmission policy holding section 211 and a transmitted frame controller 212. Under the layer 2 protocols, the transfer frame control section 210 provides the function of controlling frame transfers. The transmission policy holding section 211 holds the transmission policies that are set to individual conversations. The transmitted frame controller 212 modifies the transmitted frames of each conversation in accordance with the relevant transmission policy held by the transmission policy holding section 211. The transmitted frames thus modified are transferred through multiple links between network paths in a layer 2 network environment, as will be discussed later.

The transmission policy holding section 211 holds the transmission policies dynamically or statically. Each transmission policy is set manually or automatically to the transmission policy holding section 211. For example, a transmission policy may be set automatically by analyzing the results of data flows being monitored.

The transmission policies in the current context are combinations of input conditions with control policies, the input conditions being composed of information about sources and destinations of transmitted frames, the control policies being used to modify the transmitted frames in accordance with the input conditions. The modifications to be made of the transmitted frame typically include addition of a VLAN (virtual LAN) tag, modification of a source MAC address, and modification of a destination MAC address.

Table 1 below shows typical settings held by the transmission policy holding section 211.

TABLE 1

| Input conditions | | | | | Control policies | | | |
|---|---|---|---|---|---|---|---|---|
| Source | | Destination | | | | | | |
| MAC Address | Port Number | MAC Address | IP Address | Port Number | Control Rules | Source MAC Address | Destination MAC Address | VLAN ID |

In Table 1 above, the input conditions include the source settings and destination settings regarding the conversation of interest. The source settings are constituted by a source MAC address and a source port number of a given conversation, and the destination settings are composed of a destination MAC address, a destination IP address, and a destination port number of the transmitted frames involved.

The control policies are made up of a source MAC address, a destination MAC address, and a VLAN ID to be modified of (i.e., assigned to) the transmitted frames complying with the input conditions, as well as control rules specifying how to assign the source MAC address, destination MAC address, and VLAN ID to the applicable transmitted frames. Although an embodiment to be discussed later will be shown adopting only sequential assignment (SA) as the control rules, it is also possible to describe other rules such as assignment upon detection of an error, assignment according to priority, and assignment in keeping with a bandwidth request.

Upon receipt of a transmitted frame from the upstream TCP/IP layer 220 via the MAC service interface 221, the transmitted frame controller 212 analyzes the content of the header information in the received frame and references the relevant settings held by the transmitted policy holding section 211. Upon detecting the setting having the input condition that matches the header information of the transmitted frame, the transmitted frame controller 212 modifies the source MAC address, destination MAC address, and VLAN ID of the transmitted frame in accordance with the assignment rule described as the control policy of the setting in question, and transfers the modified addresses and ID to the downstream MAC/PHY layer 230. As a result, during transmission of a single conversation, a link aggregation can be realized by assigning a plurality of transmitted frames to a plurality of links. Although the bandwidth per link is 10 Gbps, the aggregated multiple links to which the transmitted frames are assigned may provide a higher overall bandwidth of 40 to 100 Gbps or thereabout.

Figure 3A:
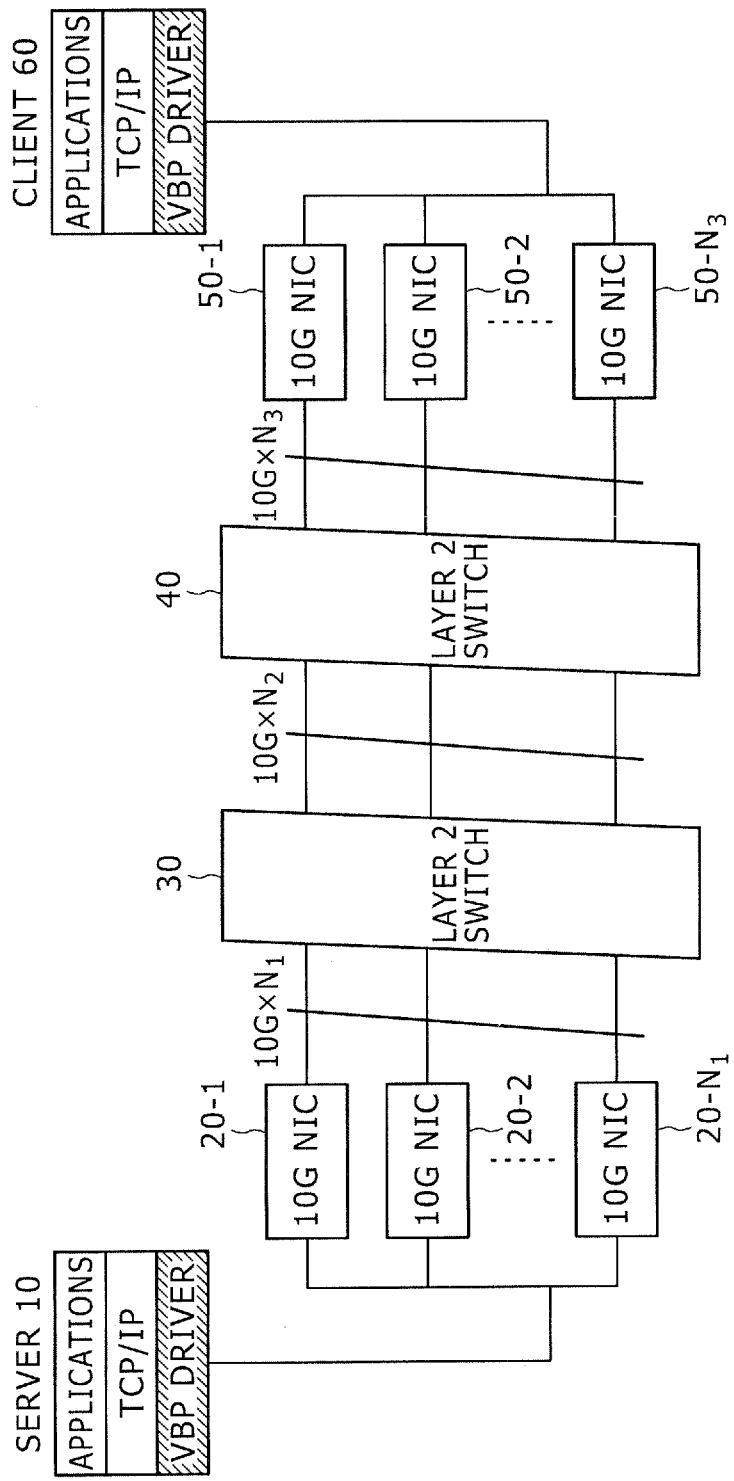
FIG. 3A is a schematic view showing a configuration example of a network system in which the transfer frame control function shown in FIG. 2 is implemented in the form of drivers.

FIG. 3A shows a configuration example of a network system in which the transfer frame control function shown in FIG. 2 is implemented in the form of software called drivers. A VBP driver kept by each of the server 10 and client 60 in FIG. 3A provides the transfer frame control (VBP) function. That is, the VBP driver functions as the above-described transmission policy holding section 211 and transfer frame controller 212.

Figure 3B:
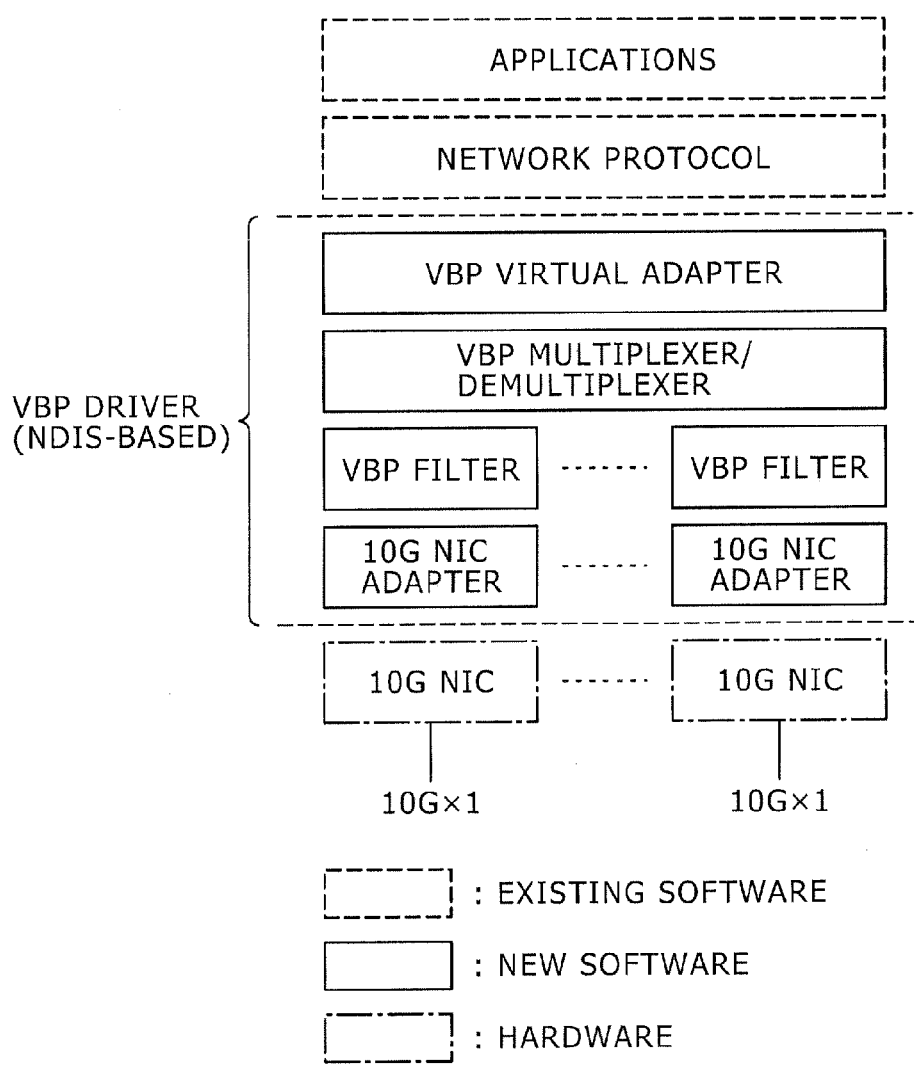
FIG. 3B is a schematic view illustrating a protocol stack structure on the Windows (registered trademark) OS in the case where the transfer frame control function shown in FIG. 2 is implemented in the form of the drivers as indicated in FIG. 3A.

FIG. 3B illustrates a protocol stack structure on the Windows (registered trademark) OS in the case where the transfer frame control function is implemented in the form of the VBP driver as indicated in FIG. 3A. FIG. 3B separately indicates three kinds of function modules: function modules that can be structured by existing software, function modules structured by new software, and function modules structured by hardware. A protocol stack formed by a VBP virtual adapter, a VBP multiplexer/demultiplexer, a VBP filter, and a NIC adapter constitutes the VBP driver that is based on NDIS, the standards for network drivers established by Microsoft Corporation of the United States. For example, if four network interface cards of 10 Gbps each are used, a throughput of 40 Gbps can be realized as an overall multi-link bandwidth.

FIG. 4A shows a configuration example of a network system in which the transfer frame control function shown in FIG. 2 is implemented in the form of hardware called the network interface card. A VBP network interface card kept by each of the server 10 and client 60 in FIG. 4A provides the transfer frame control (VBP) function. That is, the VBP network interface card functions as the above-described transmission policy holding section 211 and transfer frame controller 212.

FIG. 4B illustrates a protocol stack structure on the Windows (registered trademark) OS in the case where the transfer frame control function is implemented in the form of the VBP network interface card as indicated in FIG. 4A. FIG. 4B also indicates separately three kinds of function modules: function modules that can be structured by existing software, function modules structured by new software, and function modules structured by hardware. A protocol stack formed by a VBP virtual adapter, a VBP multiplexer/demultiplexer, and a VBP NIC adapter constitutes the VBP driver that is based on NDIS as mentioned above. For example, if each VBP network interface card has five or ten virtual links of 1 Gbps each and if four or eight VBP network interface cards are used, then a throughput of 40 Gbps can be realized as an overall multi-link bandwidth.

FIG. 5A shows a configuration example of another network system in which the transfer frame control function shown in FIG. 2 is implemented in the form of drivers. The major difference from the example of FIG. 3A is that the server 10 and the layer 2 switch 30 are not connected through multiple links. A VBP driver kept by each of the server 10 and client 60 in FIG. 5A provides the transfer frame control (VBP) function. That is, the VBP driver also functions as the above-described transmission policy holding section 211 and transfer frame controller 212.

Figure 5B:
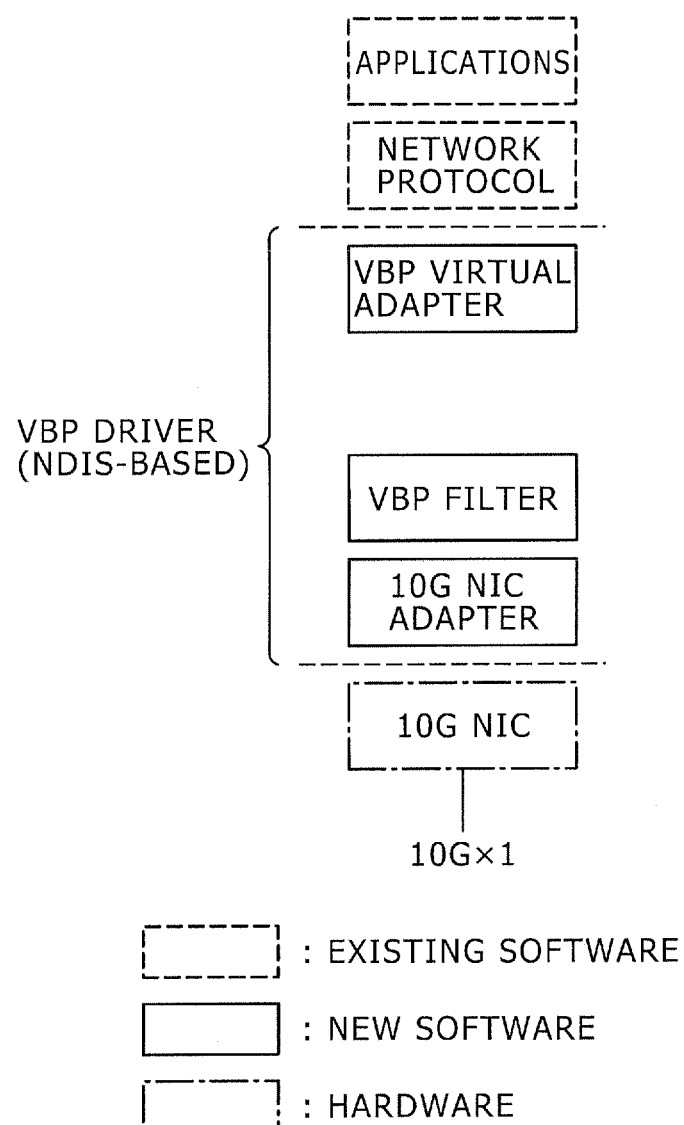
FIG. 5B is a schematic view illustrating a protocol stack structure on the Windows (registered trademark) OS in the case where the transfer frame control function shown in FIG. 2 is implemented in the form of the drivers as indicated in FIG. 5A.

FIG. 5B illustrates a protocol stack structure on the Windows (registered trademark) OS in the case where the transfer frame control function is implemented in the form of software called the VBP driver as indicated in FIG. 5A. FIG. 5B also indicates separately three kinds of function modules: function modules that can be structured by existing software, function modules structured by new software, and function modules structured by hardware. Unlike in the example of FIG. 3B, the VBP multiplexer/demultiplexer is not needed because the server 10 and the layer 2 switch 30 are not connected through multiple links. A protocol stack formed by a VBP virtual adapter, a VBP filter, and a NIC adapter constitutes the VBP driver that is based on NDIS as mentioned above. For example, if one network interface card of 10 Gbps is used, a throughput of 10 Gbps is provided.

FIG. 6A shows a configuration example of another network system in which the transfer frame control function shown in FIG. 2 is implemented in the form of hardware called the network interface card. The major difference from the example of FIG. 4A is that the server 10 and the layer 2 switch 30 are not connected through multiple links. A VBP network interface card kept by each of the server 10 and client 60 in FIG. 6A provides the transfer frame control (VBP) function. That is, the VBP network interface card also functions as the above-described transmission policy holding section 211 and transfer frame controller 212.

Figure 6B:
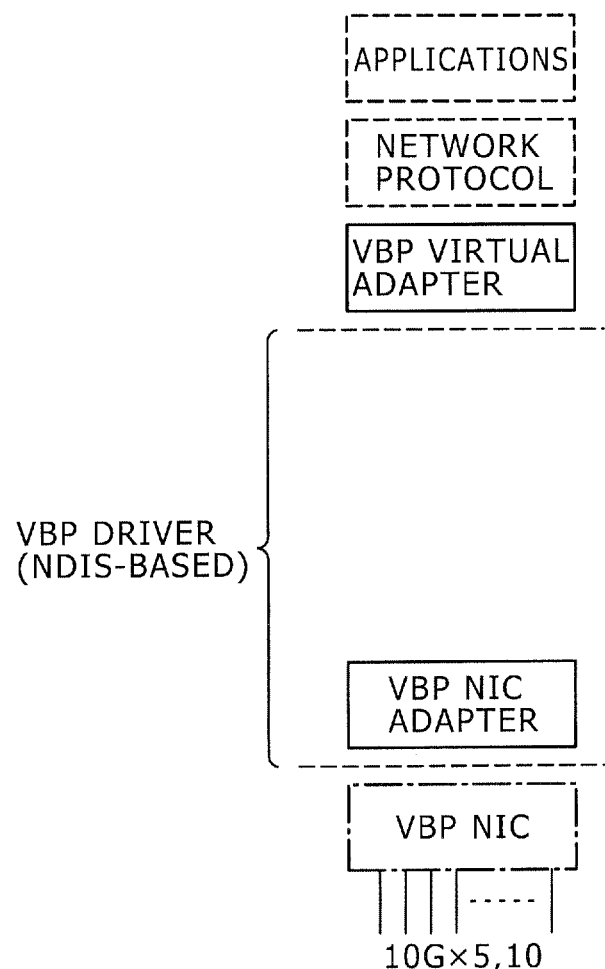
FIG. 6B is a schematic view illustrating a protocol stack structure on the Windows (registered trademark) OS in the case where the transfer frame control function shown in FIG. 2 is implemented in the form of the network interface card as indicated in FIG. 4A.

FIG. 6B illustrates a protocol stack structure on the Windows (registered trademark) OS in the case where the transfer frame control function is implemented in the form of hardware called the VBP network interface card as indicated in FIG. 6A. FIG. 6B also indicates separately three kinds of function modules: function modules that can be structured by existing software, function modules structured by new software, and function modules structured by hardware. Unlike in the example of FIG. 4B, the VBP multiplexer/demultiplexer and VBP filter are not needed because the server 10 and the layer 2 switch 30 are not connected through multiple links. A protocol stack formed by a VBP virtual adapter and a VBP NIC adapter constitutes the VBP driver that is based on NDIS as mentioned above. For example, if each VBP network interface card has five or ten virtual links of 1 Gbps each, then a throughput of 5 or 10 Gbps can be provided as an overall multi-link bandwidth.

Figure 7:
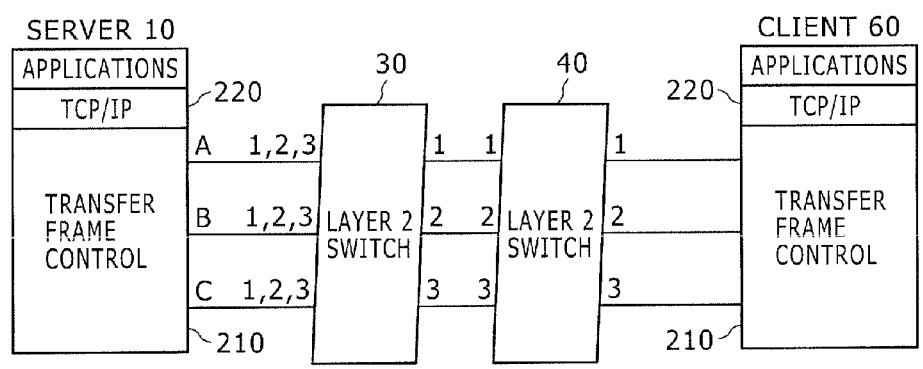
FIG. 7 is a schematic view explanatory of typical operations of the transfer frame control function (VBP) using a VLAN.

VLAN signifies a virtual network that is structured independently of physical connection topology. On layer 2, the inside of a network domain can be divided by VLAN ID. Explained below by reference to FIG. 7 is an operation example of the transfer frame control function (VBP; see FIG. 2) using a VLAN. For purpose of simplification and illustration, it is assumed that $N_1 = N_2 = N_3 = 3$.

The transfer frame control section 210 of the server 10 has three output ports A, B and C. Each of the three input ports of the layer 2 switch 30 connected with the server 10 is assigned 1, 2 and 3 as VLAN ID's.

Three output ports of the layer 2 switch 30, as well as three input ports of the layer 2 switch 40 connected with the layer 2 switch 30, are assigned 1, 2 and 3 respectively as VLAN ID's. Also, three output ports of the layer 2 switch 40 are assigned 1, 2 and 3 respectively as VLAN ID's.

What follows is an explanation of frame transfer operations on the assumption that the transmission policy holding section 211 in the transfer frame control section 210 of the server 10 holds the settings listed in Table 2 below.

TABLE 2

| Input conditions | | | | | Control policies | | | |
|---|---|---|---|---|---|---|---|---|
| Source | | Destination | | | | | | |
| MAC Address | Port Number | MAC Address | IP Address | Port Number | Control Rules | Source MAC Address | Destination MAC Address | VLAN ID |
| A | — | — | — | — | SA | A, B, C | — | — |

As the input conditions, the settings listed in Table 2 above stipulate the use of the control policies whereby the transmitted frames having the source MAC address A (i.e., transmitted frames of the conversation for which A is designated as the output port by the application) are sequentially assigned (SA) A, B and C as their source MAC addresses and 1, 2 and 3 as their VLAN ID's.

Suppose that the server 10 is requested to provide a conversation for which A is designated as the output link (source MAC address) by the application. In this case, referencing the applicable transmission policy (see Table 2) in the transmission policy holding section 211, the transmitted frame controller 212 adds VLAN tags 1, 2 and 3 sequentially to the header of each transmitted frame and then outputs the frames to the layer 2 switch 30 while switching the output link of the controller 212 sequentially from A to B to C. The output is thus performed in the following order:

A1, B2, C3, A1, B2, C3, . . .

As a result, the server 10 transmits the packets of the conversation for which A is designated as the output link by the application, with the output port of each packet switched sequentially from A to B to C and back to A again and so on. Between the layer 2 switches 30 and 40, the packets are transferred with their VLAN ID's switched sequentially from 1 to 2 to 3 and back to 1 again and so on. The layer 2 switch 40 switches sequentially the VLAN ID's of the packets from 1 to 2 to 3 and back to 1 and so on when transferring the packets to the client 60. Thus the multiple packets of the same conversation are transferred through multiple links between all devices configured. This structure provides an appreciably higher bandwidth than before.

Figure 8:
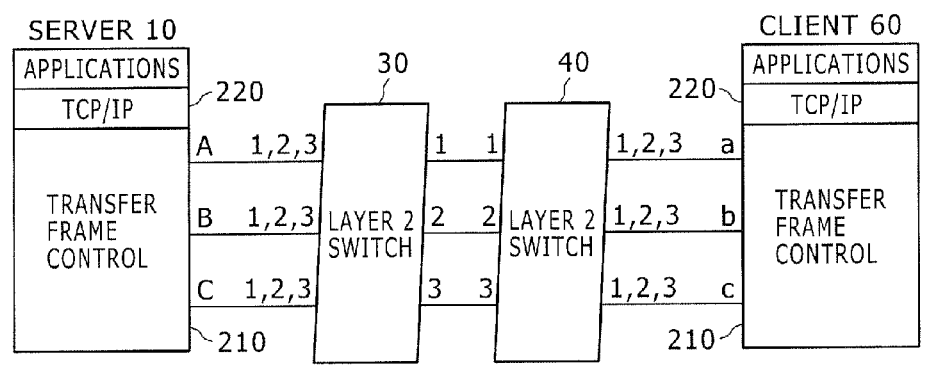
FIG. 8 is a schematic view explanatory of typical operations of the transfer frame control function (VBP) using both a VLAN and a destination MAC address.

The operation example shown in FIG. 7 involves realizing multiple links for the same conversation using a VLAN. As another example, a VLAN may be combined with a destination MAC address to realize multiple links for the same conversation. Explained below by reference to FIG. 8 is an operation example of the transfer frame control function (VBP; see FIG. 2) using a VLAN combined with a destination MAC address. For purpose of simplification and illustration, it is also assumed here that $N_1=N_2=N_3=3$.

The transfer frame control section 210 of the server 10 has three output ports A, B and C. Each of the three input ports of the layer 2 switch 30 connected with the server 10 is assigned 1, 2 and 3 as VLAN ID's. The three output ports of the layer 2 switch 30 are assigned 1, 2 and 3 respectively as VLAN ID's.

The input ports of the layer 2 switch 40 connected with the layer 2 switch 30 are assigned 1, 2 and 3 respectively as VLAN ID's. Each of the three output ports of the layer 2 switch 40 is assigned 1, 2 and 3 as VLAN ID's. The transfer frame control section 210 of the client 60 has three input ports "a," "b" and "c."

What follows is an explanation of frame transfer operations on the assumption that the transmission policy holding section 211 in the transfer frame control section 210 of the server 10 holds the settings listed in Table 3 below.

TABLE 3

| Input conditions | | | | | | Control policies | | |
|---|---|---|---|---|---|---|---|---|
| Source | | Destination | | | | | | |
| MAC Address | Port Number | MAC Address | IP Address | Port Number | Control Rules | Source MAC Address | Destination MAC Address | VLAN ID |
| A | — | a | x.x.x > x | — | SA | A, B, C | a, b, c | 1, 2, 3 |

As the input conditions, the settings listed in Table 3 above stipulate the use of the control policies whereby the transmitted frames having the source MAC address A (i.e., transmitted frames of the conversation for which A is designated as the output port, "a" as the destination device MAC address (input port), and X.X.X.X as the destination device IP address by the application) are sequentially assigned (SA) A, B and C as their source MAC addresses (source output ports); "a," "b" and "c" as their destination MAC addresses (destination input ports); and 1, 2 and 3 as their VLAN ID's.

Suppose now that the server 10 is requested to provide a conversation for which A is designated as the output link (source MAC address), "a" as the destination MAC address, and X.X.X.X as the destination IP address by the application. In this case, referencing the applicable transmission policy (see Table 3) in the transmission policy holding section 211, the transmitted frame controller 212 adds VLAN tags 1, 2 and 3 sequentially to the header of each transmitted frame, modifies the destination MAC address (destination input port) of each of the transmitted frames sequentially from "a" to "b" to "c," and outputs the frames to the layer 2 switch 30 while switching the output link of the controller 212 sequentially from A to B to C. The output is thus performed in the following order:

Aa1, Bb2, Cc3, Aa1, Bb2, Cc3, . . .

As a result, the server 10 transmits the packets of the conversation for which A is designated as the output link, "a" as the destination MAC address, and X.X.X.X as the destination IP address by the application, with the output port of each packet switched sequentially from A to B to C and back to A again and so on. Between the layer 2 switches 30 and 40, the packets are transferred with their VLAN ID's switched sequentially from 1 to 2 to 3 and back to 1 again and so on. Then the layer 2 switch 40 designates sequentially the input port of each of the packets from "a" to "b" to "c" and back to "a" and so on regardless of their VLAN ID's when transferring the packets to the client 60 through each output port of the switch 40. Thus the multiple packets of the same conversation are transferred through multiple links between all devices configured. This structure also provides an appreciably higher bandwidth than before.

Figure 9:
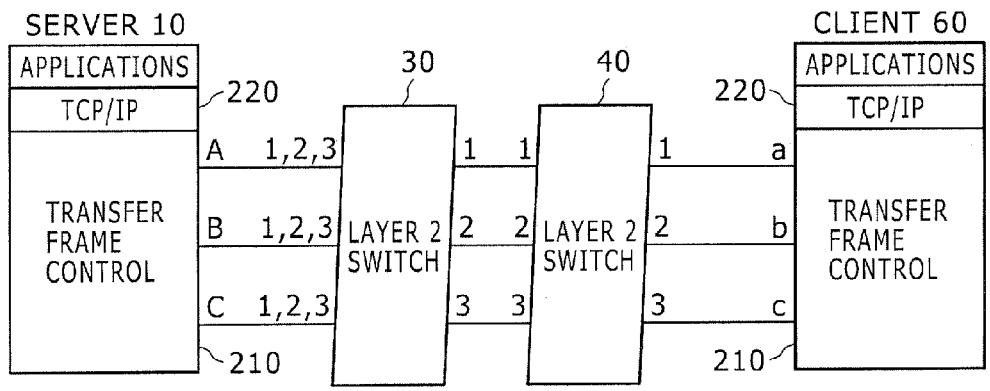
FIG. 9 is a schematic view explanatory of typical operations of the transfer frame control function (VBP) involving only modification of the MAC address.
Figure 10:
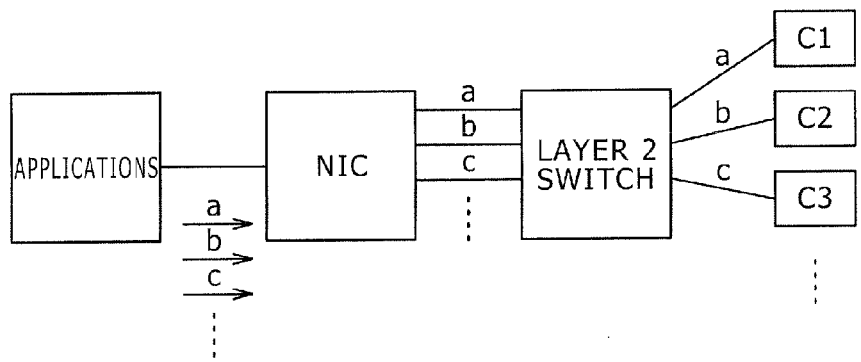
FIG. 10 is a schematic view explanatory of operations of a server-client type network system (ordinary example)
Figure 11:
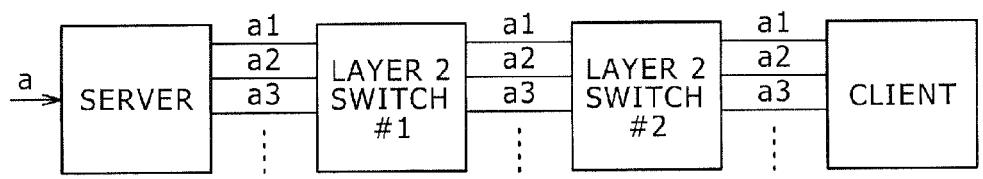
FIG. 11 is a schematic view explanatory of operations of another server-client type network system (ordinary example)

Furthermore, it is possible to operate the transfer frame control function (VBP; see FIG. 2) only through the modification of MAC addresses and without the use of the VLAN. Explained below by reference to FIG. 9 is an operation example of the transfer frame control function (VBP) having recourse to the modification of MAC addresses alone.

Some layer 2 switch products support the multi-link function (trunk function) between switches. The conditions for performing multi-link transfers vary from one product to another. Some products permit multi-link transfers if the destination MAC address or source MAC address is varied. In the example of FIG. 9, it is assumed that the layer 2 switch is set to provide multi-link transfers if the source MAC address is varied. For purpose of simplification and illustration, it is also assumed here that $N_1=N_2=N_3=3$.

The transfer frame control section 210 of the server 10 has three output ports A, B and C. Three output ports of the layer 2 switch 30, as well as three input ports of the layer 2 switch 40 connected with the layer 2 switch 30, are assigned 1, 2 and 3 respectively as VLAN ID's. The transfer frame control section 210 of the client 60 has three input ports "a," "b" and "c."

What follows is an explanation of frame transfer operations on the assumption that the transmission policy holding section 211 in the transfer frame control section 210 of the server 10 holds the settings listed in Table 4 below.

TABLE 4

| Input conditions | | | | | | Control policies | | |
|---|---|---|---|---|---|---|---|---|
| Source | | Destination | | | | | | |
| MAC Address | Port Number | MAC Address | IP Address | Port Number | Control Rules | Source MAC Address | Destination MAC Address | VLAN ID |
| A | — | a | x.x.x > x | — | SA | A, B, C | a, b, c | — |

As the input conditions, the settings listed in Table 4 above stipulate the use of the control policies whereby the transmitted frames having the source MAC address A (i.e., transmitted frames of the conversation for which A is designated as the output port, "a" as the destination device MAC address (input port), and X.X.X.X as the destination device IP address by the application) are sequentially assigned (SA) A, B and C as their source MAC addresses (source output ports); and "a," "b" and "c" as their destination MAC addresses (destination input ports).

Suppose now that the server 10 is requested to provide a conversation for which A is designated as the output link (source MAC address), "a" as the destination MAC address, and X.X.X.X as the destination IP address by the application. In this case, referencing the applicable transmission policy (see Table 4) in the transmission policy holding section 211, the transmitted frame controller 212 modifies the source MAC address (source input port) sequentially from A to B to C and the destination MAC address (destination input port) sequentially from "a" to "b" to "c" in the header of each of the transmitted frames, and outputs the modified frames to the layer 2 switch 30 while switching the output link of the controller 212 sequentially from A to B to C. The output is thus performed in the following order:

A1a, B2b, C3c, A1a, B2b, C3c, ...

As a result, the server 10 transmits the packets of the conversation for which A is designated as the output link, "a" as the destination MAC address, and X.X.X.X as the destination IP address by the application, with the output port of each frame switched sequentially from A to B to C and back to A again and so on. Between the layer 2 switches 30 and 40, the packets are transferred with their VLAN ID's switched sequentially from 1 to 2 to 3 and back to 1 again and so on. Then the layer 2 switch 40 designates sequentially the input port of each of the packets from "a" to "b" to "c" and back to "a" and so on regardless of their VLAN ID's when transferring the packets to the client 60 through each output port of the switch 40. Thus the multiple packets of the same conversation are transferred through multiple links between all devices configured. This structure also provides an appreciably higher bandwidth than before.

The transfer frame control function (VBP) illustrated in FIGS. 7 through 9 basically modifies the header information of each transmitted frame in such a manner that the layer 2 switches 30 and 40 interposed between the server 10 and the client 60 perform multi-link operations. The header information is modified in accordance with the transmission policy (see Tables 2 through 4) which applies to a given conversation and which is held by the transmission policy holding section 211. For any conversation to which a transmission policy has yet to be set, the transfer frame control section 210 performs the same operation as the ordinary NIC. This structure ensures compatibility with the existing NIC's.

According to an embodiment of the present invention described above, links of lower bandwidths are aggregated so as to run networks at lower cost, with more ease, and at higher bandwidths than before. For example, it is possible to transfer frames at a throughput of 40 Gbps without recourse to a 40 Gbps network. As another example, it is possible to run networks on the level of 10 Gbps in the low-cost 1 Gbps network environment.

If a plurality of cables connected with the communication apparatus are regarded as multiple queues, then it becomes possible to implement bandwidth control and priority control on the entire system irrespective of the Ethernet (registered trademark) switch function. For example, given suitable commands from an application, the configured cables can be distributed in a manner taking into consideration the bandwidth and priority of each stream. It is also possible to monitor the flows of data through the network interface and, based on the data flow data derived from the monitoring, to perform bandwidth control and priority control suitable for the workflow of the client.

Finally, some communication systems to which the embodiment of the present invention can be applied are explained below. A file-based communication system has communication apparatuses linked organically through various networks, so that the system can be operated in a concentrated and efficient manner compared with real-time-based communication systems. In view of that feature, the fields applicable to the invention including the intranet inside a broadcasting station are rapidly shifting from the existing real-time-based communication system to the file-based communication system.

FIG. 12 shows a configuration example of a file-based communication system. There are numerous cases where several networks are used for different purposes inside a single communication system. In the example of FIG. 12, a data network and a control network are used within the communication system. The control network transmits data such as commands and status at relatively low data rates mostly on a real-time basis. By contrast, the data network is supposed to transmit massive data such as audio and video data at high data rates.

Today, with video and audio products getting ever-higher in quality, the data size of such content is getting larger all the time. Table 5 below lists the data rates applicable to the video formats of NTSC, 2K HD, and 4K Cinema.

TABLE 5

|  | No. of samples | Formats | No. of lines | Frame rates | No. of bits | Data rates |
|---|---|---|---|---|---|---|
| NTSC | 858 | 4-2-2 | 525 | 30/1.001 | 10 | 270 M |
| 2K HD | 1920 | 4-2-2 | 1080 | 60/1.001 | 12 | 2.98 G |
|  |  | 4-4-4 |  |  | 12 | 4.47 G |
|  |  | 4-4-4 |  |  | 16 | 5.97 G |
| 4K Cinema | 4096 | 4-2-2 | 2160 | 24 | 12 | 5.10 G |
|  |  | 4-4-4 |  |  | 12 | 7.64 G |
|  |  | 4-4-4 |  |  | 16 | 10.19 G |

As shown in Table 5 above, in the case of 4K Cinema for which the sample count is 4,096, the line count is 2,160, the bit count is 444/16 bits and the frame rate is 24 FpS, the data rate is approximately 10.19 Gbps in real time (at standard speed). Thus according to the embodiment of the invention, even in the 1 Gbps network environment where the data network is inexpensive, it is possible to run that network at the level of 10 Gbps.

Although the description above contains many specificities, these should not be construed as limiting the scope of the invention but as merely providing illustrations of some of the presently preferred embodiments of this invention. It is to be understood that changes and variations may be made without departing from the spirit or scope of the claims that follow.

For example, each of the embodiments (FIGS. 7 through 9) explained above in this specification deals with an operation example based on static policies regarding the network configuration. However, this is not imitative of the present invention. As other examples, the invention may be applied to the following cases of dynamic control over transferred frames:

(1) The status of each of the configured network links is monitored. If a defective link operation is detected, the applicable link is barred from carrying the transmitted frames.

(2) The number of links used by each of the conversations involved is controlled in accordance with the previously established priority and bandwidth requirements of the conversation of interest.

(3) The status of network data flows is monitored, and the optimal number of links (in view of priority/bandwidth) for each conversation is automatically controlled accordingly.

Thus the scope of the invention should be determined by the appended claims and their legal equivalents, rather than by the examples given.

The present application contains subject matter related to that disclosed in Japanese Priority Patent Application JP 2010-031985 filed with the Japan Patent Office on Feb. 17, 2010, the entire content of which is hereby incorporated by reference.

What is claimed is:

1. A communication apparatus for communicating conversations, comprising:
a transmission policy holding section configured to hold transmission policies each corresponding to a conversation, each transmission policy identifying an output Media Access Control (MAC) address and an output address of an output port from which a frame of the conversation is sent, a destination MAC address, a destination IP address and a destination address of a destination port to which the frame of the conversation is destined and sequential assignments of the output MAC addresses and the destination MAC addresses;

a transmitted frame control section configured to modify transmitted frames of the conversation in accordance with the corresponding transmission policy held by said transmission policy holding section by sequentially changing at least the output and destination MAC addresses of each frame of the conversation as established by the sequential assignments identified in the transmission policy corresponding to the conversation; and a layer 2 switch receiving frames from the output port and transmitting those frames to the destination port in accordance with the sequentially changing output and destination MAC addresses, thereby performing link operations in accordance with the layer 2 protocols of Open Systems interconnection (OSI) standard.

2. The communication apparatus according to claim 1, wherein each conversation is made up of a series of data transmitted by an application, and is defined by a combination of a destination IP address with a destination port, number.

3. The communication apparatus according to claim 1, wherein said transmitted frame control section modifies transmitted frames between the TCP/IP layer and the MAC/PHY layer.

4. The communication apparatus according to claim 1, wherein said transmission policy holding section holds the transmission policies having settings that serve as conditions for inputting conversations and as control policies by which to modify the transmitted frames of the conversation complying with the input conditions.

5. The communication apparatus according to claim 4, wherein said control policies include policies regarding addition of Virtual LAN tags to the transmitted frames of conversations, and modification of a transmission source MAC address and modification of a transmission destination MAC address represented by said sequential assignments.

6. The communication apparatus according to claim 5, wherein said control policies include rules for assigning at least one of a VLAN tag, a transmission source MAC address, and a MAC address to the transmitted frames of the conversation.

7. The communication apparatus according to claim 1, wherein said transmission policy holding section holds control policies set dynamically, statically, manually, or automatically, each of said control policies corresponding to a conversation.

8. The communication apparatus according to claim 1, wherein said transmission policy holding section and said transmitted frame control section are each implemented as a network driver or other software.

9. The communication apparatus according to claim 1, wherein said transmission policy holding section and said transmitted frame control section are each implemented as a network interface card or other hardware.

10. A communication method, comprising the steps of:
holding transmission policies each corresponding to a conversation, each transmission policy identifying an put-out Media Access Control (MAC) address and an output address of an output port from which a frame of the conversation is sent, a destination MAC address, a destination IP address and a destination address of a destination port to which the frame of the conversation is destined and sequential assignments of the output MAC addresses and the destination MAC addresses;

modifying transmitted frames of the conversation in accordance with the corresponding transmission policy by sequentially changing at least the output and destination MAC addresses of each frame of the conversation as established by the sequential assignments identified in the transmission policy corresponding to the conversation; and transmitting frames received from the output port to the destination port in accordance with the sequentially changing output and destination MAC addresses, thereby performing link operations in accordance with the layer 2 protocols of Open Systems interconnection (OSI) standard.

11. A non-transitory computer-readable medium on which is stored a computer program for causing a computer to perform processing for data communications in accordance with the layer 2 protocols of the OSI standard by functioning as:

a transmission policy holding section configured to hold transmission policies each corresponding to a conversation, each transmission policy identifying an output Media Access Control (MAC) address and an output address of an output port from which a frame of the conversation is sent, a destination MAC address, a destination IP address and a destination address of a destination port to which the frame of the conversation is destined and sequential assignments of the output MAC addresses and the destination addresses; and a transmitted frame control section configured to modify transmitted frames of the conversation in accordance with the corresponding transmission policy held by said transmission policy holding section by sequentially changing at least the output and destination MAC addresses of each frame of the conversation as established by the sequential assignments identified in the transmission policy corresponding to the conversation;

such that a layer 2 switch that receives frames from the output port transmits those frames to the destination port in accordance with the sequentially changing output and destination MAC addresses, thereby performing link operations in accordance with the layer 2 protocols of the OSI standard.

12. A communication apparatus for communicating conversations, comprising:

transmission policy holding means for holding transmission policies each corresponding to a conversation, each transmission policy identifying an output Merlin Access Control (MAC) address and an output address of an output port from which a frame of the conversation is sent, a destination MAC address, a destination IP address and a destination address of a destination port to which the frame of the conversation is destined and sequential assignments of the output MAC addresses and the destination MAC addresses;

transmitted frame control means for modifying transmitted frames of the conversation in accordance with the corresponding transmission policy held by said transmission policy holding means by sequentially changing at least the output and destination MAC addresses of each frame of the conversation as established by the sequential assignments identified in the transmission policy corresponding to the conversation; and layer 2 switch means for receiving frames from the output port and transmitting those frames to the destination port in accordance with the sequentially changing output and destination MAC addresses, thereby performing link operations in accordance with the layer 2 protocols of the OSI standard.

* * * * *